(12) United States Patent
Tsukamoto (10) Patent No.: US 8,630,459 B2
(45) Date of Patent: *Jan. 14, 2014

(54) SIGNAL PROCESSING APPARATUS

(75) Inventor: Nobuyuki Tsukamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,718

(22) Filed: Apr. 19, 2012

(65) Prior Publication Data

US 2012/0201422 A1  Aug. 9, 2012

Related U.S. Application Data

(63) Continuation of application No. 12/247,553, filed on Oct. 8, 2008, now Pat. No. 8,189,865.

(30) Foreign Application Priority Data

Oct. 12, 2007   (JP) ................................ 2007-266604

(51) Int. Cl.
*G06K 9/00*   (2006.01)
*H04N 5/222*   (2006.01)

(52) U.S. Cl.
USPC ....................... 382/103; 382/284; 348/333.12

(58) Field of Classification Search
USPC ......... 382/100, 103, 106, 107, 154–155, 168, 382/173, 178, 181–195, 199–200, 209, 219, 382/232, 254, 274, 276, 286–300, 305, 312, 382/284; 348/333.12, 208.6, 47, 345, 561; 257/291, 499; 701/420, 455; 345/8; 379/201.03; 1/1

See application file for complete search history.

(56) References Cited

U.S. PATENT DOCUMENTS

| | | | | |
|---|---|---|---|---|
| 5,848,373 A * | 12/1998 | DeLorme et al. | ............. | 701/455 |
| 6,476,868 B1 * | 11/2002 | Kaji et al. | ................ | 348/333.12 |
| 6,507,359 B1 * | 1/2003 | Muramoto et al. | ............. | 348/47 |
| 6,542,593 B1 * | 4/2003 | Bowman-Amuah | ..... | 379/201.03 |
| 6,751,626 B2 * | 6/2004 | Brown et al. | .......... | 1/1 |
| 6,862,524 B1 * | 3/2005 | Nagda et al. | ................ | 701/420 |
| 7,103,472 B2 * | 9/2006 | Itabashi | ........................ | 701/420 |
| 7,148,861 B2 * | 12/2006 | Yelton et al. | ...................... | 345/8 |
| 7,321,158 B2 * | 1/2008 | Nabeshima | .................... | 257/499 |

FOREIGN PATENT DOCUMENTS

JP   08-336095 A   12/1996

OTHER PUBLICATIONS

The above reference was cited in a Aug. 21, 2012 Japanese Office Action, which is not enclosed, that issued in Japanese Patent Application No. 2007-266604.

* cited by examiner

*Primary Examiner* — Seyed Azarian
(74) *Attorney, Agent, or Firm* — Cowan, Liebowitz & Latman, P.C.

(57) ABSTRACT

A signal processing apparatus for displaying an input image in the sate in which a part of the image is enlarged, displays an enlarged image obtained by enlarging a part of a designated object in the input image so that the enlarged image is superimposed at a position in accordance with the position of the designated object.

18 Claims, 8 Drawing Sheets

SIGNAL PROCESSING APPARATUS

CROSS-REFERENCE TO RELATED APPLICATION

This application is a continuation of application Ser. No. 12/247,553, filed Oct. 8, 2008, the entire disclosure of which is hereby incorporated by reference.

BACKGROUND OF THE INVENTION

1. Field of the Invention

The present invention relates to a signal processing apparatus, and more particularly to a signal processing apparatus for enlarging a part of an image and superimposing the enlarged image on an original image to display the superimposed image.

2. Description of the Related Art

Conventionally, signal processing apparatus such as a video camera and a personal computer has been known as an apparatus arranged to display moving images. Some video cameras have the function of designating an object in a moving image to obtain an enlarged view of the designated object. For example, Japanese Patent Application Laid-Open No. H06-014323 discloses such a video camera.

Such a video camera is adapted to obtain an enlarged image of an object to be tracked, by detecting the motion vector of a designated object and moving the enlarged range according to the motion vector.

However, the conventional video camera has a problem of the difficulty of grasping the positional relation of the designated object to the whole original moving image owing to use of only the function of obtaining the enlarged image of the designated object.

SUMMARY OF THE INVENTION

It is an aspect of the present invention to provide a signal processing apparatus comprising: an input unit which inputs image data; a designation unit which designates a first object and a second object in the image data; a detection unit which detects a position of the first object and a position of the second object in the image data; an enlargement unit which generates a first enlarged image by enlarging an image including a part of the first object and generates a second enlarged image by enlarging an image including a part of the second object; a superimposition unit which superimposes the first enlarged image and the second enlarged image on the image data; an output unit which outputs the image data obtained by the superimposition unit to a display apparatus; and a controller which controls the superimposition unit so as to decide a superimposition position of the first enlarged image in accordance with the positions of the first object and decide a superimposition position of the second enlarged image in accordance with the position of the second object, wherein, if a positional relationship between the first object and the second object is a predetermined relation, the enlargement unit generates one enlarged image by enlarging an image including both a part of the first object and a part of the second object in place of the first enlarged image and the second enlarged image.

Further features and advantages of the present invention will become apparent from the following description of the preferred embodiments with reference to the attached drawings.

DESCRIPTION OF THE EMBODIMENTS

Exemplary embodiments of the present invention will be described with reference to the drawings.

First Embodiment

A description will be given to a signal processing apparatus that enlarges the image of a designated object included in an input moving image and superimposes the enlarged image of the object at a position corresponding to the position or movement of the object included in the input moving image to display the superimposed image.

Figure 1:
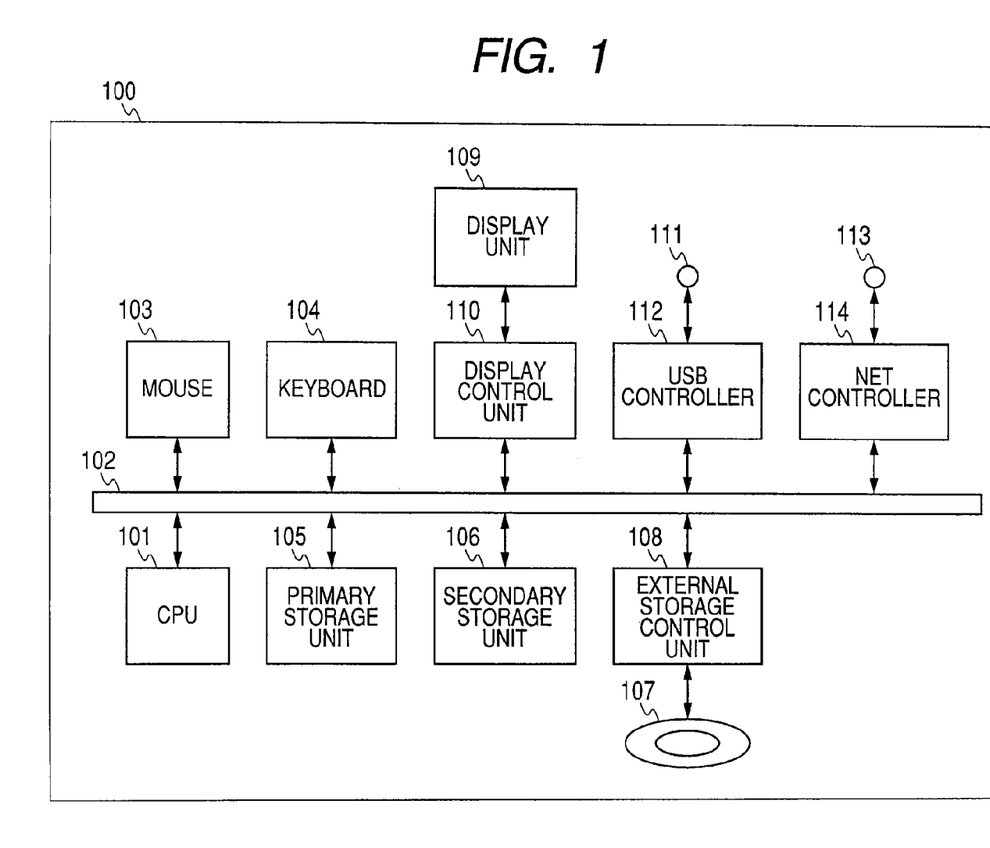
FIG. 1 is a block diagram of a signal processing apparatus to which the present invention is applied.

FIG. 1 is a block diagram illustrating the configuration of the signal processing apparatus denoted by a reference numeral 100 as the whole in FIG. 1.

In FIG. 1, the signal processing apparatus 100 includes a central processing unit (CPU) 101, a common bus 102 including a control bus and a data bus, a mouse 103, a keyboard 104, a primary storage unit (random access memory (RAM)) 105, a secondary storage unit (read only memory (ROM)) 106, an external recording medium 107, an external storage control unit 108, a display unit 109, a display control unit 110, a universal serial bus (USB) terminal 111, a USB controller 112, a network connecting terminal 113, and a network controller 114.

The CPU 101 controls each block connected to the bus 102 through the bus 102 for performing the processing of detecting the position of a designated object included in an image which is input into the signal processing apparatus 100, generating an enlarged image including a part of the designated object, and so forth. That is, the signal processing apparatus 100 uses the bus 102 to perform the transfer of address signals, control signals, and various kinds of data between each piece of equipment connected to the bus 102.

The CPU 101 performs the processing to an input image on the basis of a signal which is input with the mouse 103 and the keyboard 104.

The primary storage unit 105 is used as a working memory for the CPU 101 to execute the various kinds of processing mentioned above to an input image, and as a temporary storage for the CPU 101 to perform the control of each block.

The secondary storage unit 106 records applications describing the control procedures of the CPU 101, by which applications the various kinds of processing are performed to an input image.

The external recording medium 107 is, for example, a digital versatile disk recordable (DVD-R), a compact disc recordable (CD-R), or a memory card, and the moving image data recorded on the external recording medium 107 is input into the signal processing apparatus 100 in the present embodiment. The external storage control unit 108 controls the reading and writing of data against the external recording medium 107.

The display unit 109 displays an input image, a display screen to receive an input by an application, a screen of a result of the processing, and the like. The display control unit 110 performs the control of receiving an input image and an output of an image that has been subjected to predetermined processing and making the display unit 109 display the aforesaid screens.

The USB terminal 111 is the terminal for connecting the signal processing apparatus 100 with USB connectable equipment to exchange various kinds of data with the equipment. The USB controller 112 performs the control at the time of exchanging various kinds of data through the USB terminal 111.

The network connecting terminal 113 is the terminal for connecting the signal processing apparatus 100 to a network, and is connected to, for example, the Internet circuit to enable communication. The network controller 114 performs the control at the time of performing network connection.

The operation of an application stored in the secondary storage unit 106 of the signal processing apparatus 100 of the present embodiment is described with reference to FIGS. 2 and 3 here. The application is executed by the CPU 101 using the primary storage unit 105. The application performs the processing of detecting an object designated by a user in an input moving image by image analysis. Next, the application performs the processing of detecting the positions of the designated object respectively in a plurality of frames of the moving image, and further performs the processing of detecting a motion vector by comparing the respective positions. Then, the application performs the processing of moving an enlarged range for enlarging a part of the designated object, according to the detected positions and motion vector of the object. Then, the application performs the processing of generating an enlarged image by enlarging the image in the enlarged range (the image including the part of the object) to superimpose the enlarged image at the detected positions of the object and the positions according to the motion vector in the moving image.

The operation at the time of reproducing the moving image information indicating an input image of a plurality of frames to display the reproduced moving image information is described.

The moving image information recorded in the external recording medium 107 is read by the external storage control unit 108, and the reproducing processing of the moving image information is performed by the application under the control of the CPU 101. The moving image information that has received the reproducing processing is the image data of the plurality of frames, and is displayed on the display unit 109 frame by frame by the display control unit 110.

Figure 2:
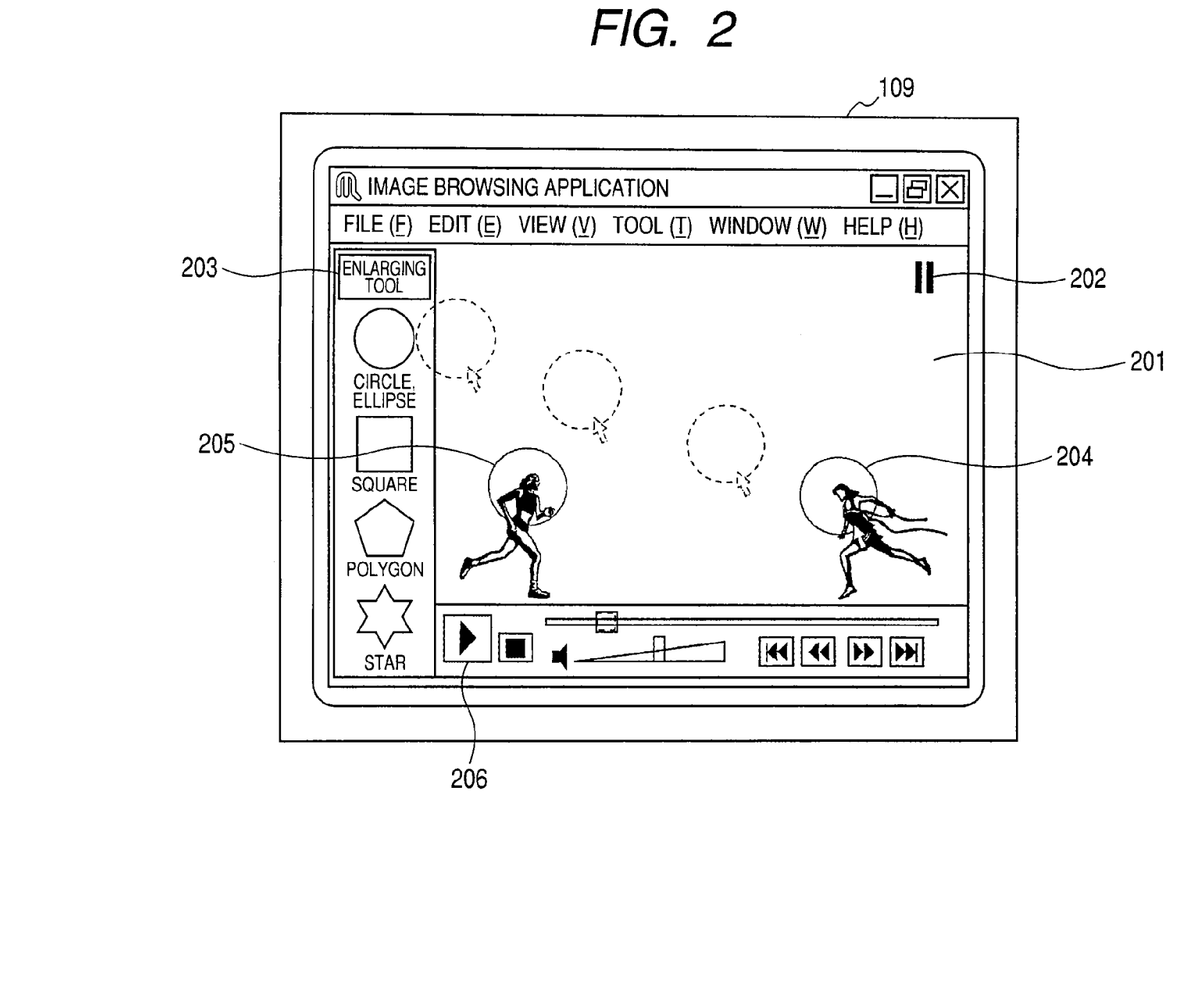
FIG. 2 is a view for illustrating the operation of an application of the present invention.

FIG. 2 is a view illustrating a state in which the moving image information reproduced by the application is displayed on the display unit 109. A user can depress an icon displayed on the display unit 109 with the mouse 103, which is a pointing device. Various functions are assigned to the icons.

In FIG. 2, an image 201 is that of the moving image data that has been read from the external recording media 107 and has been input into the signal processing apparatus 100. An icon 202 indicates that the input moving image information is in its temporary stopping state.

A user can designate an object by means of a tool for enlarging a specific object on the screen, for example, when the moving image is in its temporary stopping state. To put it concretely, the user drags an enlarging tool 203 arranged on the left side of the display unit 109 in FIG. 2 with the mouse 103 and drops the enlarging tool 203 on an object that the user wants to display in its enlarged state, and thus the user can designate the object. A state 204 expresses the state in which a person on the right side in the moving image is designated as a specific object with a circular enlarging tool 203. Similarly, a state 205 expresses the state in which a person on the left side is designated as a specific object with the circular enlarging tool 203. The application analyzes the images in the areas in the moving image, where the enlarging tools 203 are arranged, and thereby recognizes the objects, such as the persons, as the specific objects.

The ranges encircled by the enlarging tools 203 are set as enlarged ranges, and the images obtained by enlarging the images encircled by the enlarging tools 203 are referred to as enlarged images.

Although the objects are designated by the use of the circular enlarging tools 203 here, objects may be designated by means of the enlarging tools 203 having various forms, such as a square, a polygon, and a star. Moreover, the designation may be performed by directly clicking an object with the pointing device. If direct clicking is performed, the signal processing apparatus 100 may decide the shape of the enlarged image in a random manner, or the shape of the enlarged image decided by a user in advance may be displayed.

When the reproducing (play) button 206 is clicked in the state of FIG. 2, the moving image moves from the temporary stopping state to its reproducing state. In response to the movement of the moving image to the reproducing state, the application detects the positions of the designated objects respectively in a plurality of frames of the reproduced moving image. Then, the application moves the enlarged range so as to include the parts of the detected objects according to the positions of the objects respectively in the plurality of frames, and decides the superimposing positions of the enlarged images according to the detected positions of the object respectively in the plurality of frames.

In the present embodiment, the images obtained by enlarging the moving image encircled by the enlarging tools 203 to be about twice as large as the original moving image are superimposed substantially at the center positions of the positions designated by the enlarging tools 203 on the original moving image data as enlarged images.

Figure 3:
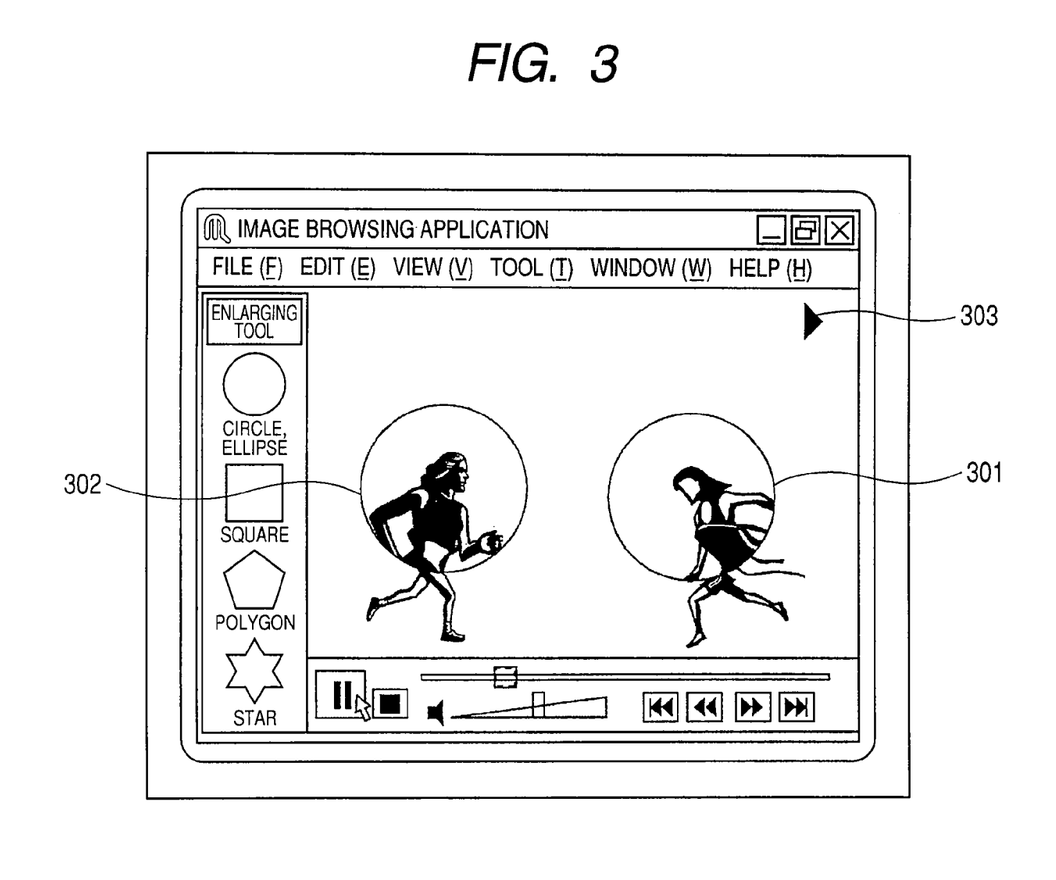
FIG. 3 is a view for illustrating the operation of the application of the present invention.

FIG. 3 illustrates this state. At this time, the positions of the objects in the image are detected so as to enable the parts of the objects, and the enlarged ranges are moved to the detected positions. Then the enlarged images are generated by cutting out the ranges designated by the enlarged ranges after enlarging the images in square regions including the enlarged ranges. Then, the generated enlarged images are superimposed at the positions according to the positions of the designated objects in the image. In the present embodiment, for example, the enlarged images are superimposed at the centers of the designated objects.

In FIG. 3, an enlarged image 301 is that of the input object on the right side in the moving image, and an enlarged image 302 is that of the object on the left side in the moving image. Both of the enlarged images 301 and 302 are displayed in the states of being superimposed on the original moving image. An icon 303 indicates that the moving image data is in the reproducing state thereof.

By the configuration described above, even if an object designated in the original moving image moves, the enlarging display of the object can be performed continuously, and furthermore the enlarged image of the object moves together with the object. Consequently, the relative positional relation of the object also becomes easy to grasp.

Moreover, by coloring the frames encircling the enlarged images, the present embodiment enable a user to easily recognize which enlarged image is displayed when enlarged images approach to each other. Moreover, a character or mark for the distinction of the enlarged images may be displayed in each of the enlarged images.

Moreover, it is also possible to vary the size of a frame encircled by an enlarging tool 203 and the enlargement factor of the enlarging tool 203 by an operation of a user.

Although an example of not varying the size of the object has been described in the present embodiment, the size of an enlarged range may be enlarged proportionally when an object is approaching to appear to be larger. In this case, the signal processing apparatus 100 may be adapted to detect the size of an object, to enlarge the enlarged range of the object according to the detected size of the object, and to superimpose the enlarged image enlarged by a predetermined magnification ratio. By such adaptation, the confirmation of the enlarged image becomes easier. Moreover, the signal processing apparatus 100 may be adapted to leave the size of the enlarged range of an object as it is and continue to track the object even if the size of the object has varied. The signal processing apparatus 100 may be adapted to enable a user to set whether to vary the size of the enlarged range of an object according to the size thereof or not by means of a menu screen. Otherwise such adaptation can be realized by preparing, as the types of the enlarging tools, an enlarging tool to vary the size of the enlarged range of the object according to the size of the object and an enlarging tool not to vary the size of the enlarged range of the object according to the size of the object.

According to the present embodiment, there can be provided the signal processing apparatus 100 capable of obtaining an image easy to recognize the positional relation of a designated object to the whole moving image, even if the object is enlarged to be displayed.

Although an example of inputting moving image data from the external recording medium 107 has been illustrated in the present embodiment, the moving image data may be input from the other media. For example, the moving image data may be input from the network connecting terminal 113, or may be input from a built-in hard disk. Alternatively, image data may be generated from a signal obtained with a not-shown television (TV) broadcasting antenna, and be input into the signal processing apparatus 100.

Moreover, although the enlarging tools 203 for enlarging a specific object on a screen are arranged by means of the pointing device in the present embodiment, the enlarging tools 203 can be arranged with the keyboard 104. That is, the enlarging tools 203 can be also arranged by performing predetermined instructions to the signal processing apparatus 100 from a remote controller or the like.

Moreover, although the description has been given to the enlarged moving image displayed by being superimposed in the present embodiment, the enlarged image obtained by such a way can be also recorded on a recording medium.

Moreover, although an example of the processing by the application running in the signal processing apparatus 100 has been illustrated in the present embodiment, the processing may be realized by the hardware having the respective functions.

Second Embodiment

In the first embodiment, the description has been given to superimpose the enlarged image of an object designated with the enlarging tool 203 in a moving image, at a position corresponding to a position where the designated object is displayed in the original moving image. That is, the first embodiment is adapted to superimpose the enlarged image, while tracking the movement of the designated object in the image.

In the present second embodiment, a description will be given to the processing of designating a plurality of objects with the enlarging tool, especially to the processing of the case in which the designated objects approach to each other, with reference to FIGS. 4 to 7.

The signal processing apparatus 100 of the present embodiment calculates the possibility that the display ranges of enlarged moving images may overlap with each other, by means of the positions and motion vectors of a plurality of objects in a plurality of frames, the shapes and enlargement factors of the enlarging tools, and the like. Then, for example, if the display ranges of enlarged images overlap with each other when the enlarged images are superimposed at the center positions of the objects, then the following display can be performed by the setting of a user.

Figure 4:
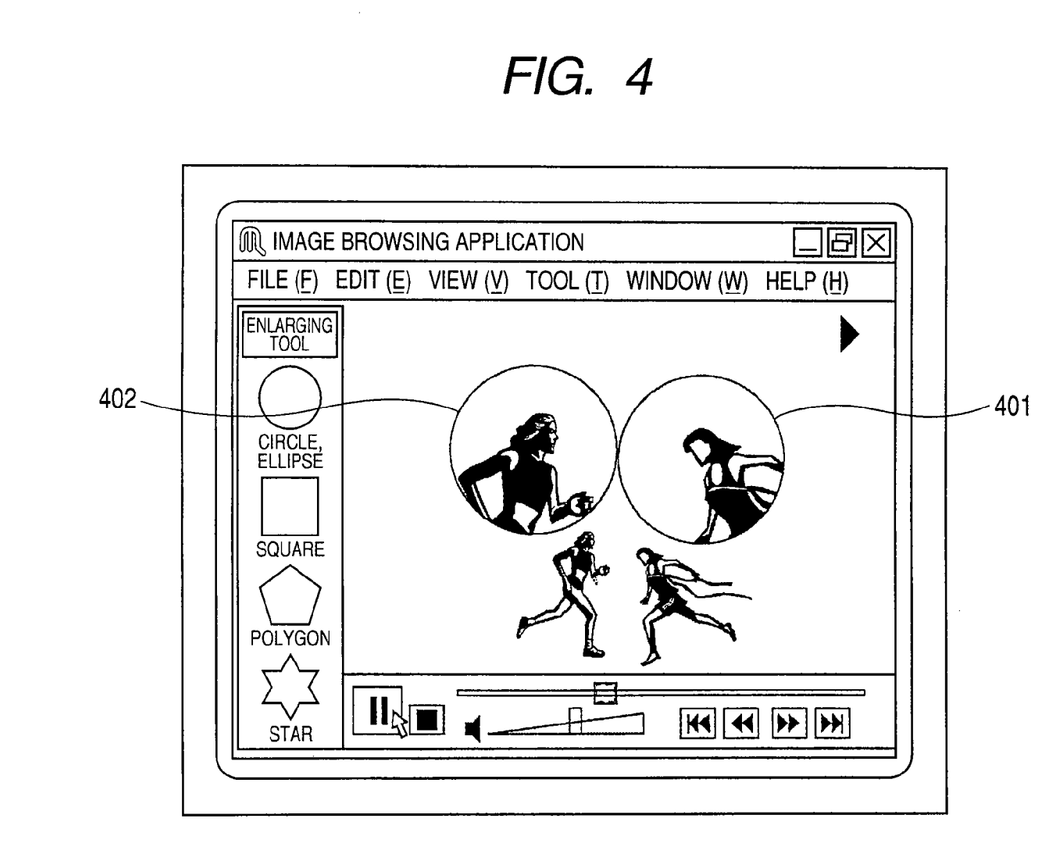
FIG. 4 is a view for illustrating the operation of another application of the present invention.

If the designated objects approach to each other, their enlarged images 401 and 402 may be displayed at positions where the enlarged images 401 and 402 do not overlap with each other, as shown in FIG. 4.

In this case, the superimposition positions of the enlarged images 401 and 402 are first moved to positions other than the center positions of the designated objects on the application of the embodiment. In the present embodiment, the superimposition positions are moved upwardly with respect to the designated objects. Then, the positions where the enlarged images 401 and 402 can be displayed side by side in the horizontal direction are set as the superimposition positions, so that the enlarged images 401 and 402 do not overlap with each other.

The positions where the enlarged images 401 and 402 do not overlap with each other can be set by setting the positions in such a manner that the distance between the superimposition positions may be made longer than a distance obtained by mutually adding the respective values obtained by multiplying the radius of the enlarging tool of each of the enlarged images 401 and 402 by the enlargement factor of each of them, respectively.

Figure 5:
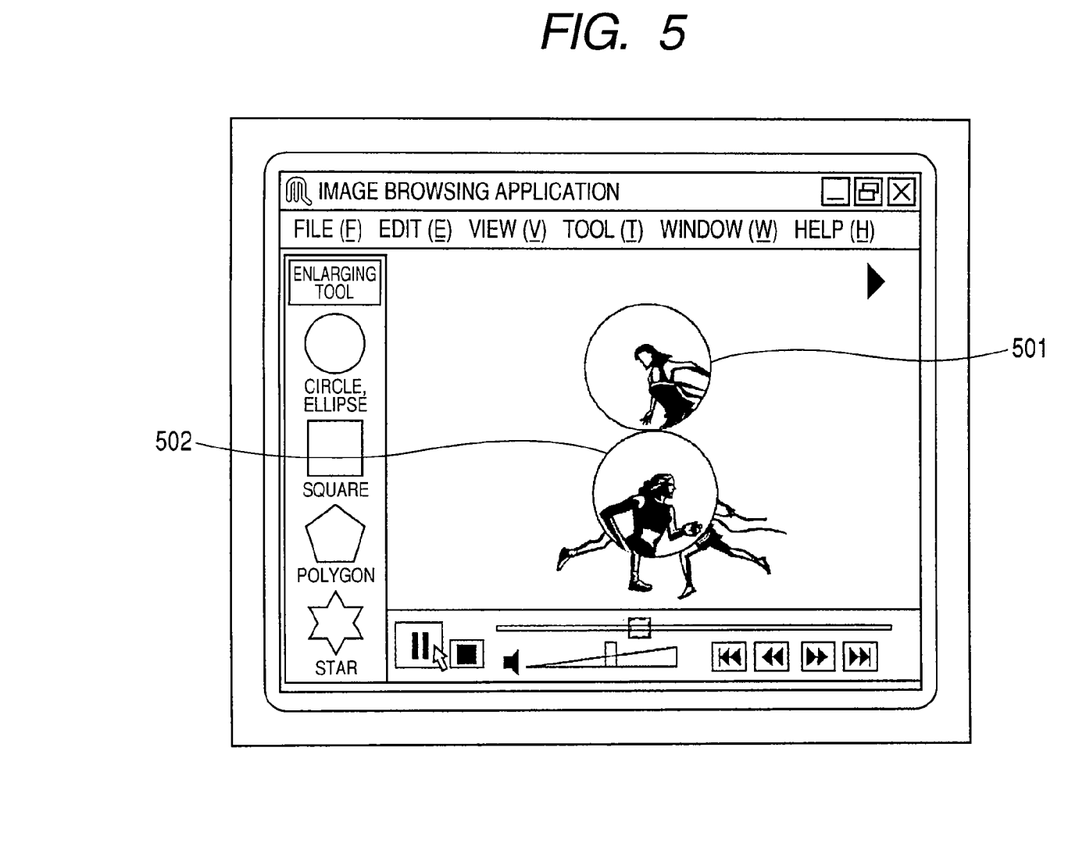
FIG. 5 is a view for illustrating the operation of the application of the present invention.

Moreover, enlarged images 501 and 502 may be displayed at the positions where the enlarged images 501 and 502 do not overlap with each other when designated objects approach to each other, as shown in FIG. 5.

In this case, the superimposition positions are set at the positions where the enlarged images 501 and 502 can be displayed side by side in the vertical direction on the application, so that the enlarged images 501 and 502 do not overlap with each other. The positions where the enlarged images 501 and 502 do not overlap with each other can be set by setting the positions in such a manner that the distance between the superimposition positions may be made longer than a distance obtained by mutually adding the respective values obtained by multiplying the radius of the enlarging tool of each of the enlarged images 501 and 502 by the enlargement factor of each of them, respectively.

The setting of the display positions of the enlarged images 401, 402, 501, and 502 where the enlarged images 401, 402, 501, and 502 do not overlap with each other by moving the positions of the enlarged images 401, 402, 501, and 502 as illustrated in FIGS. 4 and 5 is referred to as "separation setting" in the present embodiment.

Figure 6:
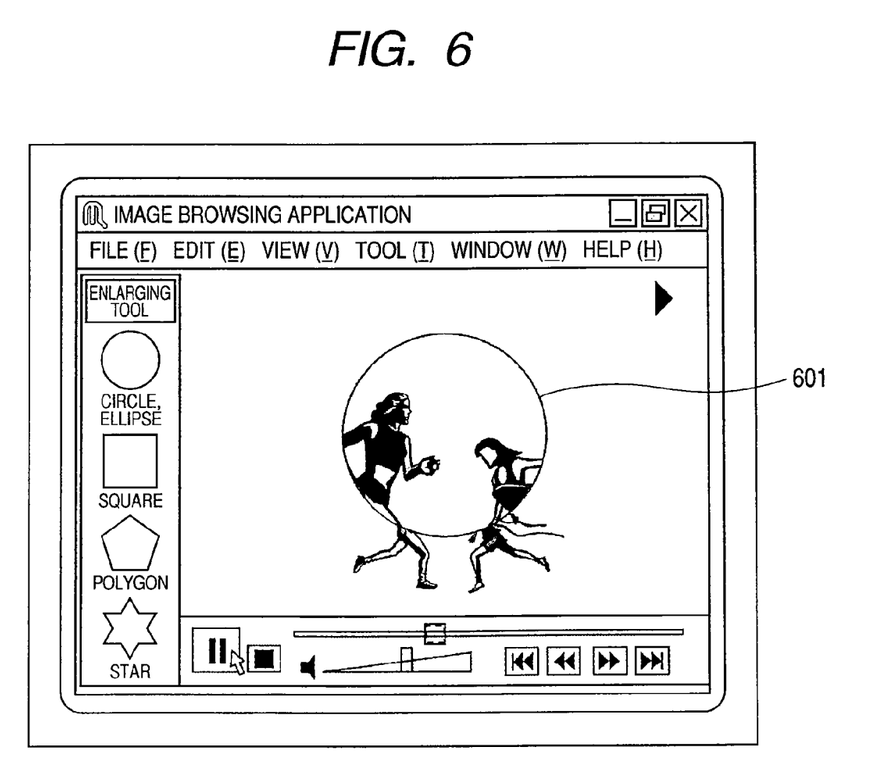
FIG. 6 is a view for illustrating the operation of the application of the present invention.

Moreover, when designated objects approach to each other, the enlarged images of the objects may be gathered to one enlarged image 601 as shown in FIG. 6. In order to realize this function, the enlarged ranges of a plurality of designated objects are re-set so that the objects may be displayed by enlarged sizes at the same time.

In this case, the middle position of a line segment connecting the center positions of the designated objects is set as the superimposing position by the application. Then, a range including parts of both of the designated objects is newly designated as the enlarged range. Otherwise, for example, a range including at least the center positions of each of the enlarging tools is newly designated as the enlarged range. The superimposition position is not limited to the position, and other positions may be used. The position calculated from the positions and motion vectors of the designated objects is used as the superimposing position.

The setting of displaying the enlarged images to be combined as shown in FIG. 6 is referred to "combination setting" in the present embodiment.

Figure 7:
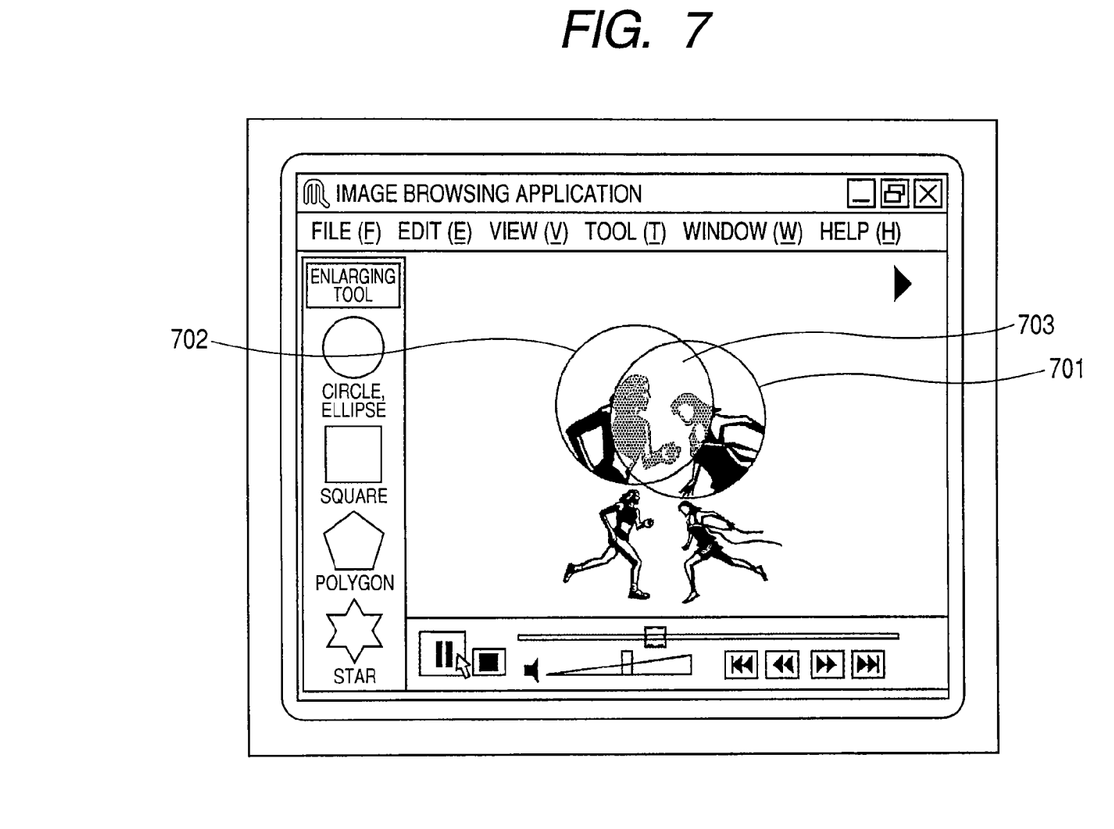
FIG. 7 is a view for illustrating the operation of the application of the present invention.

Moreover, when the designated objects approach to each other, enlarged images 701 and 702 that are in an overlapping range may be combined to be displayed to enable a user to confirm both of the images, as shown in FIG. 7. In the case of FIG. 7, the image corresponding to a range 703 is displayed as a semitransparent image, and the other enlarged images 701 and 702 are displayed as not-transmitting images. The image in the range 703 is attained by using "alpha blending" for combining images by adjusting the transmission ratios of the enlarged images 701 and 702. The description of the "alpha blending" technique is omitted since the technique is known one.

In this case, the position where the enlarged images 701 and 702 are superimposed is first moved to a position other than the center positions of the objects by the application. In the present embodiment, the superimposing position is moved upwardly with respect to the designated objects. Then, the overlapping range 703 of the enlarged images 701 and 702 is calculated on the basis of the coordinates indicating the center positions of the enlarging tools of the plurality of objects, the enlargement factors, and the shapes of the enlarging tools. The transmission ratio of the coordinates of the range 703, where the enlarged images 701 and 702 overlap with each other, is set to a predetermined value, and the enlarged images 701 and 702 are superimposed on the original moving image.

The setting of displaying the enlarged images 701 and 702 in the state in which parts of the enlarged images 701 and 702 are made to be transparent is referred to as "transmission setting" in the present embodiment.

As described above, when the designated objects approach to each other, superimposition positions can be changes and the display modes of the enlarged moving image to be superimposed can be changed. A user can switch these settings by means of a menu screen or the like.

Figure 8:
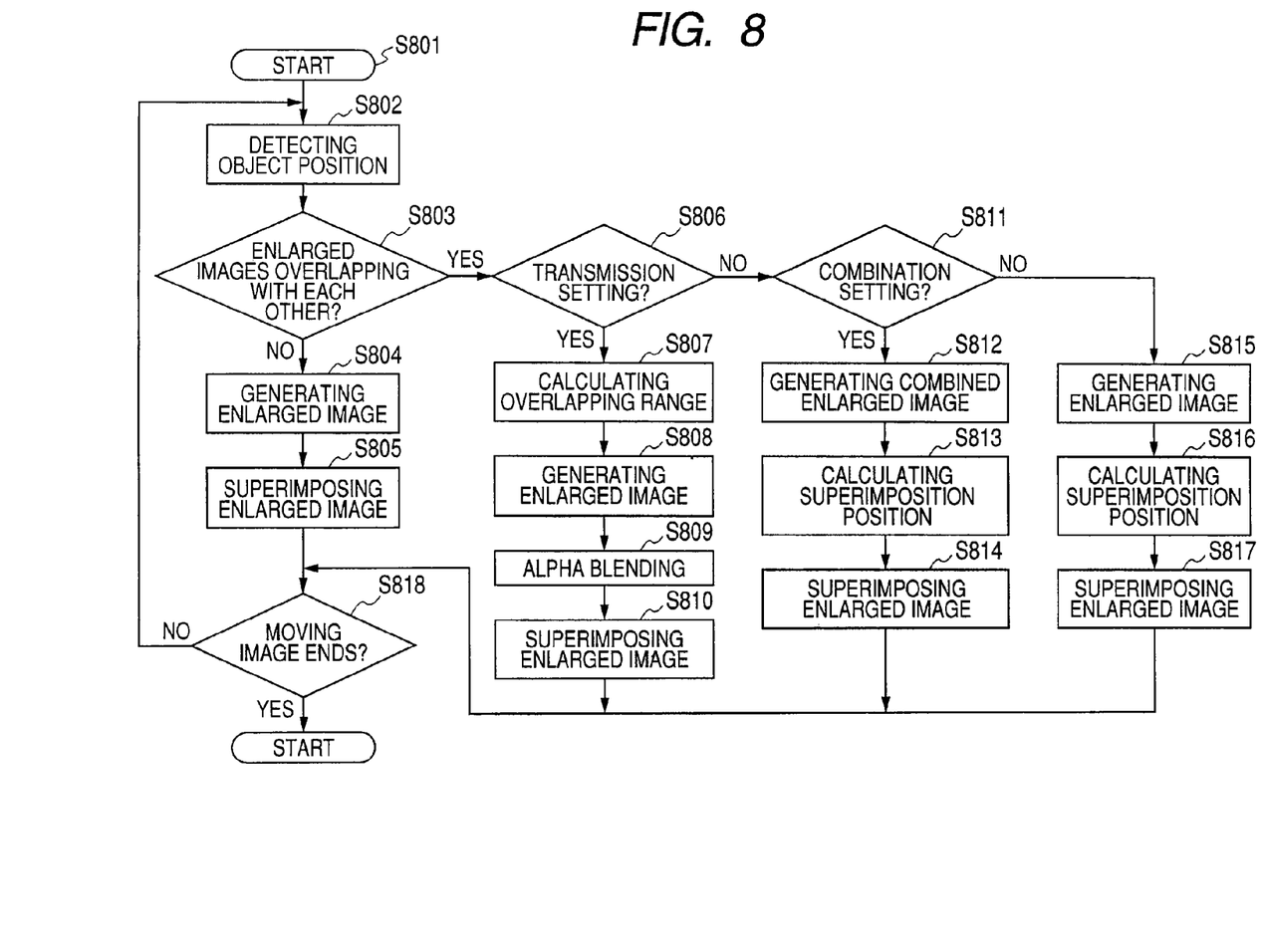
FIG. 8 is a flow diagram for illustrating the operation of the applications of the present invention.

The processing in the case where the designated objects approach to each other is described with reference to the flow diagram of FIG. 8.

When an icon for performing reproduction is clicked in the state where a plurality of objects displayed on a screen are designated, reproduction is started (Step S801). When the reproduction is started, the positions of the objects designated by enlarging tools respectively in a plurality of frames are first detected (Step S802). Then, it is detected whether enlarged images overlap with each other or not, on the basis of the positions of the detected objects. At this time, the overlapping may be detected only from the positions of the objects, but it may be further detected whether the enlarged images overlap with each other or not, by taking into consideration the shapes of the frames of the enlarged images (Step S803).

First, the case where the enlarged images do not overlap with each other is described (No at Step S803). In this case, the enlarged images are generated as described in the first embodiment (Step S804), and the enlarged images are superimposed at the positions corresponding to the positions of the designated objects in the original moving image (Step S805).

The present embodiment is adapted to enable a user to previously set how to superimpose enlarged images when objects approach to each other. If the superimposition positions of enlarged images are moved as shown in FIGS. 4 and 5, then the "separation setting" is used. If enlarged images are combined to superimpose one enlarged image as shown in FIG. 6, the "combination setting" is used. If enlarged images in an overlapping range are combined to be displayed as shown in FIG. 7, the "transmission setting" is used.

Next, a description is given to the case where the positions of objects are situated at the positions where the enlarged images overlap with each other when the enlarged images are superimposed on the original moving image (Yes at Step S803). Next, the setting on the application is confirmed.

If the setting is the "transmission setting" (Yes at Step S806), then the positions where the enlarged images overlap with each other are calculated on the basis of the positions of detected objects and the shapes of the enlarged images (Step S807). Then, the enlarged images are generated (Step S808), and the enlarged images in the calculated overlapping range are combined by the "alpha blending" (Step S809). Then, the combined enlarged image is superimposed at the position according to the positions of the objects in the original moving image, and the combined image is superimposed at the position where the enlarged images overlap with each other. The example of FIG. 7 illustrates a screen of the moving image generated in this manner.

Although the position where the enlarged images overlap with each other has been calculated on the basis of the positions of the objects and the shapes of the enlarged images here, the calculation may be performed by using the shapes and magnification ratios of the enlarging tools in place of the shapes of the enlarged images. Moreover, if only objects have been designated, then the calculation may be performed on the basis of the positions and shapes of the objects. The shape means a form, a size, and the like.

If the setting is the "combination setting" (No at Step S806 and Yes at Step S811), for example, a range including at least the center position of each of the enlarging tools is designated as the enlarged range, and the enlarged image in the enlarged range is generated (Step S812). That is, two enlarged images are integrated to one enlarged image in the present embodiment. Next, the superimposition position is set as the middle position of the line segment connecting the respective center positions of designated objects (Step S813). Then, the integrated enlarged image is superimposed at the set superimposition position to be displayed (Step S814). The example of FIG. 6 illustrates a screen of the moving image generated in this manner.

The superimposition position is not limited to this position here, and other positions may be used. The position calculated on the basis of positions and motion vectors of the designated objects is used as the superimposing position. Furthermore, although one enlarged image has been generated from two enlarged images, one enlarged image may be obtained from three enlarged images.

If the setting is the "separation setting" (No at Step S806 and No at Step S811), enlarged images are generated first (Step S815). Next, positions where the enlarged images do not overlap with each other are calculated as the superimposition positions on the basis of the shapes of the respective enlarged images and the positions of the respective designated objects (Step S816), and the enlarged images are superimposed on the original moving image, respectively (Step S817). The examples illustrated in FIGS. 4 and 5 illustrate screens of the moving images generated in this manner.

The setting of whether the enlarged images are horizontally arranged side by side as illustrated in FIG. 4 or whether the enlarged images are vertically arranged side by side as illustrated in FIG. 5 may be adapted to be set by a user's operation. Moreover, the enlarged images may be adapted to move to the positions where the enlarged images do not overlap with each other, according to the positional relation between designated objects.

The processing described above is repeatedly preformed until an instruction of stopping the moving image is input or until the end of the moving image (Step S818).

When the display ranges of enlarged images overlap with each other if the enlarged images are superimposed at the center positions of objects like this, the positional relation between the objects becomes easy to recognize even if the enlarged images are superimposes, by switching the display of the enlarged images.

In the present embodiment, the description has been given to the case where the display ranges of enlarged images overlap with each other owing to the movements of objects if the enlarged images are superimposed at the center positions of the objects. However, for example, if the display ranges of the enlarged images originally overlap with each other even if the objects do not move, the enlarged images may be displayed by being combined as illustrated in FIG. 6 of the present embodiment. Moreover, the enlarged images may be displayed at the positions where the enlarged images do not overlap with each other as illustrated in FIGS. 4 and 5 by moving the positions of the enlarged images. Furthermore, the parts of the enlarged images may be displayed in the transparent state as illustrated in FIG. 7. Then, if the display ranges of enlarged images originally overlap with each other, the display may be fixed at the positions where the enlarged images are displayed first to be left in their superimposed states as they are without moving the enlarged images to follow the movement of the objects.

Although a computer has been described as the signal processing apparatus in the embodiments of the present invention, the present invention can be applied to other apparatus as long as the apparatus can display image data. For example, the present invention can be applied to a video camera, a compact digital camera, a television, a hard disk recorder, and the like.

Moreover, it is needless to say that the objects of the present invention can be also achieved by supplying a storage medium recording the program codes of the software for realizing the functions of the embodiments described above to a system or an apparatus. At this time, the computer (or a CPU or a micro processing unit (MPU)) of the supplied system or apparatus reads the program codes stored in the storage medium to execute the program codes.

In this case, the program codes, read from the storage medium, themselves realize the functions of the embodiments described above, the program codes themselves and the storage medium storing the program codes constitute the present invention.

As the storage medium for supplying the program codes, for example, a flexible disk, a hard disk, an optical disk, a magneto-optical disk, a compact disc read-only memory (CD-ROM), a CD-R, a magnetic tape, a nonvolatile memory card, and a ROM may be used.

Moreover, it is needless to say that the case is also included where a basic system, an operating system (OS), or the like that is operating on a computer executes a part or the whole of the processing on the basis of the instructions of the aforesaid program codes and the functions of the embodiments described above are realized by the processing.

Furthermore, it is needless to say that the case is also included where the program codes read from the storing medium are written into a memory equipped on a function expanding board inserted into a computer or a function expanding unit connected to a computer and the functions of the embodiments described above are thereby realized. At this time, the CPU or the like equipped in the function expanding board or the function expanding unit executes the part of the whole of the actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2007-266604, filed Oct. 12, 2007, which is hereby incorporated by reference herein in its entirety.

What is claimed is:

1. A signal processing apparatus comprising:
   an input unit which inputs image data;
   a designation unit which designates a first object and a second object in the image data;
   a superimposition unit which superimposes a first enlarged image by enlarging a image including a part of the first object and a second enlarged image by enlarging an image including a part of the second object on the image data; and
   an output unit which outputs the image data obtained by the superimposition unit to a display apparatus;
   wherein, if a positional relationship between the first object and the second object is a predetermined relation, the superimposition unit superimposes one enlarged image by enlarging an image including both a part of the first object and a part of the second object.

2. The signal processing apparatus according to claim 1, wherein a superimposition position of the one enlarged image is decided on a basis of the position of the first object and the position of the second object.

3. The signal processing apparatus according to claim 1, further comprising,
   an enlargement unit which generates an enlarged image in every shape.

4. The signal processing apparatus according to claim 1, further comprising,
   an enlargement unit which generates an enlarged image in a predetermined shape selected from among a plurality of shapes.

5. The signal processing apparatus according to claim 1, further comprising,
   an enlargement unit which generates an enlarged image by enlarging at least twice an image including a part of an object.

6. A signal processing method comprising:
   a designating step of designating a first object and a second object in an input image data;
   superimposing a first enlarged image by enlarging a image including a part of the first object and a second enlarged image by enlarging a image including a part of the second object on the image data;

an outputting step of outputting the image data which is superimposed the first enlarged image and the second enlarged image thereon;

wherein, if the positional relationship between the first object and the second object is a predetermined relation, the superimposition step superimposes one enlarged image by enlarging an image including both a part of the first object and a part of the second object.

7. The signal processing method according to claim 6,
wherein the superimposing step superimposes the one enlarged image on the image data, and
wherein a superimposition position of the one enlarged image is decided on a basis of the position of the first object and the position of the second object.

8. The signal processing method according to claim 6, further comprising,
a generating step of generating an enlarged image in every shape.

9. A signal processing apparatus comprising:
an input unit which inputs image data;
a designation unit which designates a first object and a second object in the image data;
a superimposition unit which superimposes a first enlarged image by enlarging a image including a part of the first object and a second enlarged image by enlarging a image including a part of the second object on the image data; and
an output unit which outputs the image data obtained by the superimposition unit to a display apparatus;
an analyzing unit which analyzes an overlapping range of the first enlarged image and the second enlarged image; and
a combining unit which generates a combined image by combining the first enlarged image and the second enlarged image in the overlapping range,
wherein the superimposition unit superimposes the combined image on the image data.

10. The signal processing apparatus according to claim 9, further comprising,
an enlargement unit which generates an enlarged image in every shape.

11. The signal processing apparatus according to claim 9, further comprising,
an enlargement unit which generates an enlarged image in a predetermined shape selected from among a plurality of shapes.

12. The signal processing apparatus according to claim 9, further comprising,
an enlargement unit which generates an enlarged image by enlarging at least twice an image including a part of an object.

13. A signal processing method comprising the steps of:
a designating step of designating a first object and a second object included in an input image data;
a superimposing step of superimposing a first enlarged image by enlarging a image including a part of the first object and a second enlarged image by enlarging a image including a part of the second object on the image data;
an outputting step of outputting the image data which is superimposed the first enlarged image and the second enlarged image thereon;
an analyzing step of analyzing an overlapping range of the first enlarged image and the second enlarged image; and
a generating step of generating a combined image by combining the first enlarged image and the second enlarged image in the overlapping range,
wherein the superimposing step superimposes the combined image generated on the moving image data.

14. An image processing apparatus comprising:
an obtain unit which obtains image data;
a designation unit which designates a first object and a second object in the image data in the image data;
a superimposition unit which superimposes a first enlarged image by enlarging a image including a part of the first object and a second enlarged image by enlarging a image including a part of the second object on the image data; and
a controller which decides a superimposition position of the first enlarged image and the second enlarged image so as not to overlap the first enlarged image and the second enlarged image, in accordance with the position of the first object and the position of the second object.

15. The image processing apparatus according to claim 14, further comprising,
an enlargement unit which generates an enlarged image in every shape.

16. The image processing apparatus according to claim 14, further comprising,
an enlargement unit which generates an enlarged image in a predetermined shape selected from among a plurality of shapes.

17. The image processing apparatus according to claim 14, further comprising,
an enlargement unit which generates an enlarged image by enlarging at least twice an image including a part of an object.

18. A control method for image processing apparatus, said image processing apparatus has an obtain unit which obtains image data, a designation unit which designates a first object and a second object in the image data in the image data, and a superimposition unit which superimposes a first enlarged image by enlarging a image including a part of the first object and a second enlarged image by enlarging a image including a part of the second object on the image data, said method comprising:
deciding a superimposition positions of the first enlarged image and the second enlarged image so as not to overlap the first enlarged image and the second enlarged image, in accordance with the position of the first object and the position of the second object.

* * * * *